United States Patent
Srivastava et al.

(10) Patent No.: US 11,271,746 B2
(45) Date of Patent: Mar. 8, 2022

(54) COMPONENT COMMISSIONING TO IOT HUB USING PERMISSIONED BLOCKCHAIN

(71) Applicant: Otis Elevator Company, Farmington, CT (US)

(72) Inventors: Raj Gaurav Srivastava, Uttar Pradesh (IN); Mohammed Saif Husain, West Bengal (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 189 days.

(21) Appl. No.: 16/520,953

(22) Filed: Jul. 24, 2019

(65) Prior Publication Data
US 2020/0044859 A1 Feb. 6, 2020

(30) Foreign Application Priority Data
Aug. 1, 2018 (IN) .............................. 201811028908

(51) Int. Cl.
H04L 29/06 (2006.01)
H04L 9/32 (2006.01)
H04L 9/08 (2006.01)

(52) U.S. Cl.
CPC .......... *H04L 9/3236* (2013.01); *H04L 9/0825* (2013.01); *H04L 9/0894* (2013.01); *H04L 2209/38* (2013.01)

(58) Field of Classification Search
CPC ... H04L 9/3236; H04L 9/0825; H04L 9/0894; H04L 2209/38; H04L 63/0876; H04L 41/0806; H04W 12/06; H04W 12/50
See application file for complete search history.

(56) References Cited

U.S. PATENT DOCUMENTS 9,641,342 B2 5/2017 Sriram et al.
9,860,258 B1 1/2018 Collins et al.
(Continued)

OTHER PUBLICATIONS

U. Guin, P. Cui and A. Skjellum, "Ensuring Proof-of-Authenticity of IoT Edge Devices Using Blockchain Technology," 2018 IEEE International Conference on Internet of Things (iThings) and IEEE Green Computing and Communications (GreenCom) and IEEE Cyber, Physical and Social Computing (CPSCom) and IEEE (Year: 2018).*
(Continued)

*Primary Examiner* — Yogesh Paliwal
(74) *Attorney, Agent, or Firm* — Cantor Colburn LLP (57) ABSTRACT

A method and apparatus for commissioning a device to an Internet of Things (IoT) Hub using a permissioned blockchain. The method includes preparing a device to be commissioned by providing the device with meta-information and a set of cryptographic keys, initializing the device to facilitate communication with a permissioned blockchain by a trusted user, storing at least a portion of the meta-information in the permissioned blockchain, and receiving and storing by the device, a hash key from the permissioned blockchain, the hash key based on the storing. The method also includes connecting to the device via a service tool to obtain the hash key and verifying the hash key with the permissioned block chain. If the verifying is successful, communicating device information to a cloud service, the cloud service in communication with the IoT Hub to enable the commissioning.

18 Claims, 4 Drawing Sheets

(56) References Cited

U.S. PATENT DOCUMENTS

| | | | |
|---|---|---|---|
| 2017/0046664 A1 | 2/2017 | Haldenby et al. | |
| 2018/0091506 A1* | 3/2018 | Chow | G06Q 20/085 |
| 2018/0109395 A1* | 4/2018 | Berdy | H04W 64/003 |
| 2018/0136633 A1 | 5/2018 | Small et al. | |
| 2018/0183587 A1* | 6/2018 | Won | H04L 9/0891 |
| 2018/0189312 A1* | 7/2018 | Alas | G06F 21/64 |
| 2019/0306232 A1* | 10/2019 | Brock | H04W 4/70 |
| 2019/0372834 A1* | 12/2019 | Patil | H04L 41/085 |

OTHER PUBLICATIONS

[Item U continued] Smart Data (SmartData), Halifax, NS, Canada, Jul. 30, 2018, pp. 1042-1049, doi: 10.1109/Cybermatics_2018.2018.00193 (Year: 2018).*

European Search Report for EP 19189688.5, dated Oct. 7, 2019, 19 pages.

Guinn, Ujjwal et al., "Ensuring Proof-of-Authenticity of IoT Edge Devices using Blockchain Technology", 2018, Confs on Internet of Things, Green Computing and Communications, Cyber, Physical and Social Computing , pp. 1042-1047.

Hardjono, Thomas et al., "Cloud-Based Commissioning of Constrained Devices using Permissioned Blockchains", Proceedings of ACM IoT Privacy, Trust & Security—IoTPTS 2016 Xi'an, China, May 2016, 8 pgs.

Hardjono, Thomas, "On PrivacyPreserving Identity within Future Blockchain Systems", available at: https://www.w3.org/2016/04/blockchainworkshop/interest/hardjonopentland.html, May 2016, 5 pages.

Holman, G. Ken, "The role of UBL in disintermediating procurement and transportation processes", available at: https://www.xml.com/articles/2017/06/20/ubldisintermediating/, 2017, 11 pages.

Huertas, Juan et al., "Eximchain: Supply Chain Finance solutions on a secured public, permissioned blockchain hybrid", Mar. 13, 2018 V6, available at: http://www.wallerlaw.com/portalresource/Blockchain-Basics, 15 pages.

Jones, Duncan, "How to Secure 'Permissioned' Blockchains", Thales e-Security Blog, Mar. 15, 2018, 3 pages.

Jones, Duncan, "How to Secure 'Permissioned' Blockchains", available at: https://www.darkreading.com/endpoint/howtosecurepermissionedblockchains/a/did/1331129, Feb. 28, 2018, 7 pages.

Kayam, Ty et al., "Blockchain Basics: Overview of Distributed Ledger Technology, Application in Health Care, and Legal Considerations", Business Law and Governance, Nov. 20, 2017, 3 pages.

Laaper, Stephen et al., "Using blockchain to drive supply chain innovation", Deloitte Development LLC, 2017, 12 pages.

Mearian, Lucas, "Maersk, IBM create world's first blockchain-based, electronic shipping platform", Computerworld, IDG Communications, Inc., Jan. 16, 2018, 7 pages.

Walker, Heather, "How Digital Signatures and Blockchains Can Work Together", Crytomathic, Jun. 8, 2018, 5 pages.

Xia, Qi et al., "MeDShare: Trust-Less Medical Data Sharing Among Cloud Service Providers via Blockchain", IEEE Access, Digital Object Identifier, vol. 5, date of current version Aug. 14, 2017, 11 pages.

* cited by examiner

COMPONENT COMMISSIONING TO IOT HUB USING PERMISSIONED BLOCKCHAIN

FOREIGN PRIORITY

This application claims priority to Indian Patent Application No. 201811028908, filed Aug. 1, 2018, and all the benefits accruing therefrom under 35 U.S.C. § 119, the contents of which in its entirety are herein incorporated by reference.

BACKGROUND

The subject matter disclosed herein generally relates to security and access control solution, video processing, and cloud computing and, more particularly, to commissioning of a component to a cloud environment in an Internet of Things IoT architecture with a cloud-based integration platform.

The Internet of Things" (IoT) consists of web-enabled smart devices that use embedded processors, sensors and communication hardware to collect, send and act on data they acquire from their environments. IoT devices share the sensor data they collect by connecting to an IoT gateway or other edge device where data is either sent to the cloud to be analyzed or analyzed locally. Sometimes, these devices communicate with other related devices and act on the information they get from one another. Typically, the devices do most of the work without human intervention, although people can interact with the devices for instance, to set them up (commissioning), give them instructions or access the data. Advocates of IoT connectivity promote the promise of improved communications, quality of life, overall betterment of society, and the like. Therefore, ease of connectivity and adding IoT devices to the environment is necessary to ensure continued growth, functionality, novelty and relevance. At the same time, in practical implementation, as more devices are Internet connected, and interconnected, greater amounts of data are shared in an ever increasing number of ways. To that end, ensuring security of data and protection of privacy becomes important.

Generally building systems solutions are implemented with standard hardware devices, controllers, sensors, and the like on location. In addition, at times, software solutions may be installed and maintained on local controllers, on-premises servers and computers and the like. In some instances software solutions may take advantage of some form of cloud computing environment to avoid the cost of dedicated servers and computing services. With hardware components, commissioning and interconnection to the cloud environment are required to facilitate trusted communication to the devices. Currently, components are commonly shipped with public keys managed by a trusted third party certification authority where a cloud service interacts with devices to retrieve public key and proceeds with commissioning to cloud (IoT Hub). In this instance because all trust is placed on the third party certification authority, there is a possibility of cloning of hardware components, tampering of public keys, or unsecure or infiltrated communications. To address these concerns what is needed is a solution that enables securing devices by removing or reducing third party involvement for storing keys and yet enabling secured communication.

SUMMARY

According to one embodiment, described herein in an embodiment is a method and apparatus for commissioning a device to an Internet of Things (IoT) Hub using a permissioned blockchain. The method includes preparing a device to be commissioned by providing the device with meta-information and a set of cryptographic keys, initializing the device to facilitate communication with a permissioned blockchain by a trusted user, storing at least a portion of the meta-information in the permissioned blockchain, and receiving and storing by the device, a hash key from the permissioned blockchain, the hash key based on the storing. The method also includes connecting to the device via a service tool to obtain the hash key and verifying the hash key with the permissioned block chain. If the verifying is successful, communicating device information to a cloud service, the cloud service in communication with the IoT Hub to enable the commissioning.

In addition to one or more of the features described above, or as an alternative, further embodiments may include that the meta-information includes at least a device identification.

In addition to one or more of the features described above, or as an alternative, further embodiments may include that the cryptographic keys include at least one of a public key and a private key.

In addition to one or more of the features described above, or as an alternative, further embodiments may include that the initializing includes verifying permissions for a trusted user/the device with the permissioned blockchain.

In addition to one or more of the features described above, or as an alternative, further embodiments may include that the meta-information stored in the permissioned blockchain is sufficient to enable the commissioning to the IoT Hub.

In addition to one or more of the features described above, or as an alternative, further embodiments may include that storing is in a single block of the permissioned blockchain.

In addition to one or more of the features described above, or as an alternative, further embodiments may include that the hash key is generated based on the meta-information and the cryptographic keys.

In addition to one or more of the features described above, or as an alternative, further embodiments may include that the hash key is stored in the device rendering the cryptographic keys unavailable.

In addition to one or more of the features described above, or as an alternative, further embodiments may include that the connecting includes executing an application installed on the service tool configured to facilitate communication with at least one of the device, the permissioned blockchain, and a cloud service.

In addition to one or more of the features described above, or as an alternative, further embodiments may include that the connecting includes permissioned communication with the permissioned block chain.

In addition to one or more of the features described above, or as an alternative, further embodiments may include terminating the method if at least one of the hash key is not available on the device or the hash key is not verified by the permissioned blockchain.

In addition to one or more of the features described above, or as an alternative, further embodiments may include that the verifying is successful if the hash key stored on the device matches the hash key store in the permissioned blockchain.

In addition to one or more of the features described above, or as an alternative, further embodiments may include that the device information communicated to the cloud service includes the hash key, and the cloud service connects to the IoT Hub and commissions the device to the IoT Hub.

In addition to one or more of the features described above, or as an alternative, further embodiments may include notifying the service tool if the commissioning is successful.

In addition to one or more of the features described above, or as an alternative, further embodiments may include that the blockchain includes rules for verifying permissions of at least a trusted user and the service tool.

In addition to one or more of the features described above, or as an alternative, further embodiments may include that an operator of the service tool and the trusted user are the same.

Also described herein in an embodiment is a system for commissioning a device to Internet of Things (IoT) Hub using a permissioned blockchain. The system includes a permissioned blockchain, and a device expected to be commissioned to an IoT Hub, the device including meta-information and a set of cryptographic keys, the device configured to facilitate communication with a permissioned blockchain by a trusted user. At least a portion of the meta-information is stored in the permissioned blockchain, and the device receives and stores a hash key provided by the permissioned blockchain and the hash key is based on the meta-information stored. The system also includes a service tool in operable communication with the device and the permissioned blockchain, the service to configured to obtain the hash key from the device and verify the hash key with the permissioned block chain, wherein, if the has key is verified, the service tool communicates device information to a cloud service, the cloud service in communication with the IoT Hub to enable the commissioning.

In addition to one or more of the features described above, or as an alternative, further embodiments may include that the meta-information includes identification information associated with the device.

In addition to one or more of the features described above, or as an alternative, further embodiments may include that the permissioned blockchain is configured to verify permissions for a trusted user/the device.

In addition to one or more of the features described above, or as an alternative, further embodiments may include that the hash key is stored in the device rendering the cryptographic keys unavailable.

In addition to one or more of the features described above, or as an alternative, further embodiments may include that the service tool includes an application configured to facilitate communication with at least one of the device, the permissioned blockchain, and a cloud service.

In addition to one or more of the features described above, or as an alternative, further embodiments may include that the device information communicated to the cloud service includes the hash key, and the cloud service connects to the IoT Hub and commissions the device to the IoT Hub.

In addition to one or more of the features described above, or as an alternative, further embodiments may include that an operator of the service tool and the trusted user are the same.

In addition to one or more of the features described above, or as an alternative, further embodiments may include that the device is a controller in at least one of an elevator system, an access control and security system, and an HVAC system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Embodiments described herein are directed to a method of commissioning a component to an Internet of Things (IoT) Hub using a permissioned blockchain. In an embodiment, when an IoT component or device is shipped it is generally provided with a hardware Id and cryptographic keys, e.g, public keys (and possibly private keys) from the factory. Generally the public keys are managed by third party agencies. As part of the delivery of the device, the first time it is initialized the keys and device hardware Id is added as a transaction in a protected ledger. A hash key is generated and transmitted back to the device. The generated hash key is then stored in the device. The hash key is employed to replace the public keys and the device Id. The ledger is distributed on different node on blockchain network and will be treated as one block. When the device is commissioned (for example, at a customer site), it is commissioned with the cloud to an IoT Hub using a hash key. This eliminates the need for a trusted third party central agency to generate a key and Id. In each instance the hash key stored with the device is all that is needed to ensure the trusted communication. Advantageously, because all of the devices' information is stored in the blockchain, any instance of tampering with keys, cloning, and the like will be not be validated. The blockchain provide unique device digital identity, which protects against cloning and tampering associated with the device. All transactions on the permissioned blockchain are cryptographically secured and provide data integrity. Moreover, even though device commissioning happens across multiple systems and databases the blockchain can be used as a single shared ledger, which reduces complexity of managing separate systems. It should be appreciated that while the embodiments are described herein with reference to a device associated with a conveyance system, these descriptions are for illustration only and should not be considered limiting. The described embodiments are readily applicable to any application where a device commissioning to an IoT Hub is desirable and secure communications would be advantageous. For example, the embodiments disclosed herein may be equally suitable for applications security, access control solutions, fire suppression systems, heating, ventilation, and cooling (HVAC) and elevator control systems.

It is understood in advance that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at various operational characteristics, several types of service models, and several deployment models.

Characteristics include, but are not limited to on-demand self-service permitting users to access services and capabilities as needed; broad network access, which facilitates access by a broad variety of interfaces an client platforms, resource pooling for the provider to serve multiple consumers using a multi-tenant model; rapid elasticity so that capabilities can scaled and provisioned quickly, and measured service where resource usage can be monitored, controlled, and reported providing transparency for both the provider and consumer of the utilized service. Service models include Software as a Service (SaaS) where the capability provided to the consumer is to use the provider's applications running on a cloud infrastructure. The applications are accessible from various client devices through a thin client interface such as a web browser (e.g., web-based e-mail); Platform as a Service (PaaS), where the capability provided to the consumer is to deploy onto the cloud infrastructure consumer-created or acquired applications, commonly created using programming languages and tools supported by the provider; and Infrastructure as a Service (IaaS), where the capability provided to the consumer is to provision processing, storage, networks, and other fundamental computing resources where the consumer is able to deploy and run arbitrary software, which can include operating systems and applications. Finally, cloud computing deployment models include private, community, public or hybrid infrastructures. A cloud computing environment is service oriented with a focus on statelessness. At the heart of cloud computing is an infrastructure comprising a network of interconnected nodes.

Figure 1:
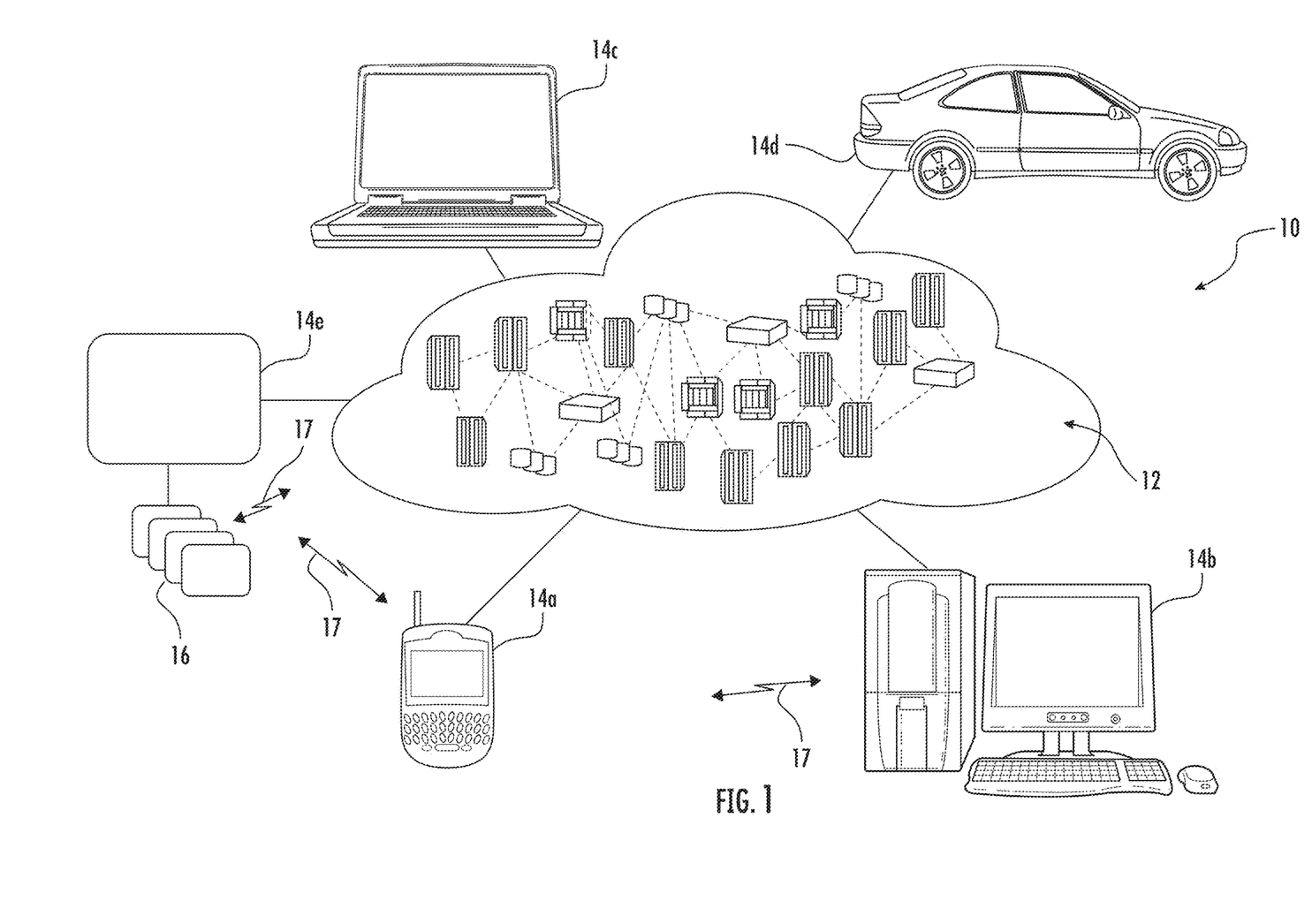
FIG. 1 depicts a cloud computing environment in accordance with one or more exemplary embodiments.

Referring now to FIG. 1, an illustrative cloud computing environment 10 is depicted. As shown, cloud computing environment 10 comprises one or more cloud computing nodes 12 with which on-premises computing devices denoted generally as 14 and particularly as 14a-14e may communicate. The on-premises computing devices 14a-e are generally connected to an on-premises local area network (LAN) 17, wide area network (WAN) or cellular, and the like to facilitate communication with a the cloud computing nodes 12. For example, the on-premises computing devices could be, a personal digital assistant (PDA) or cellular telephone 14a, desktop computer/terminal/server 14b, laptop computer 14c, a vehicle 14d, or a security or access control panel 14e. Computing devices 14a-e may also be configured to communicate with each other or a variety of sensors 16. The communication with other computing devices 14a-e or sensors 16 could be wired or wireless as needed. The communication could also be via a Local Area Network (LAN) if desired as depicted by arrows 17. Cloud computing nodes 12 may communicate with one another and/or be grouped (not shown) physically or virtually, in one or more networks, such as Private, Community, Public, or Hybrid clouds as described above, or in one or more combinations thereof. This allows cloud computing environment 10 to offer infrastructure, platforms and/or software as services for which a cloud consumer does not need to maintain or minimize resources at a local computing device level. It is understood that the types of computing devices 14 shown in FIG. 1 are intended to be illustrative only and that computing nodes 12 and cloud computing environment 10 can communicate with any type of computerized device over any type of network and/or network addressable connection (e.g., using a web browser).

Figure 2:
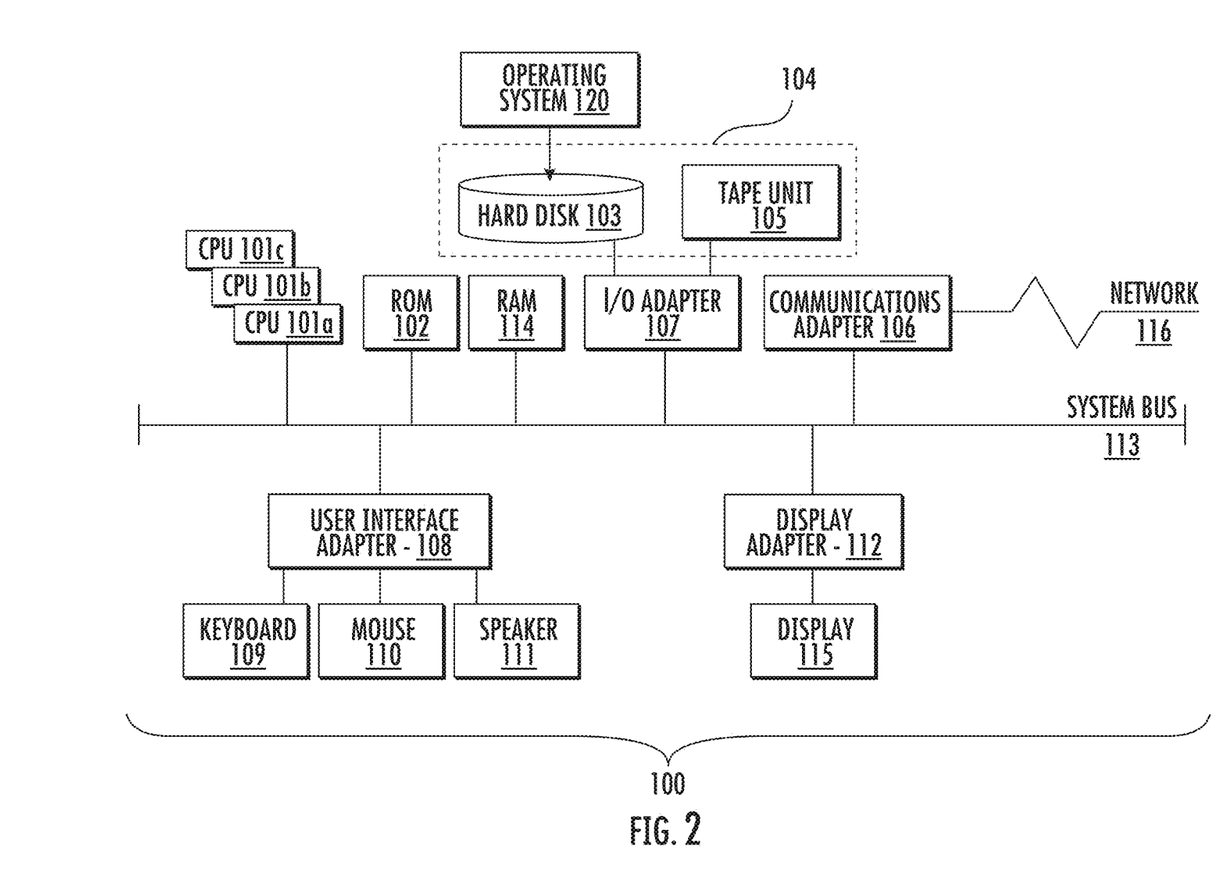
FIG. 2 is a block diagram illustrating one example of a processing system for practice of the teachings herein in accordance with one or more exemplary embodiments.

Referring to FIG. 2, there is shown an embodiment of a processing system 100 for a given computing device 14 as may be employed for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 2 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 2, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3. It should be appreciate that the components of the system as described are for illustration purposes only. Features and functions as described may be omitted, integrated, or distributed as desired and as required to suit a particular application.

Embodiments described herein are directed to commissioning of an interface board for elevator access and control management solutions implemented in a hybrid cloud/on-premises solution with secure communications. One or more exemplary embodiments as disclosed herein provides a simplified scheme for ensuring secure communication between the on-premises device and cloud based applications without significant impact or on-premises configuration. Advantageously in on or more embodiments the method described eliminates the need for third party authentication and certificate generation and specialized interfaces and programming in order to maintain secure communications with the cloud and allows for tamper-proof licensing, centralized authorization management and multi-tenancy and enables a gradual path to entirely cloud hosted solutions.

Figure 3:
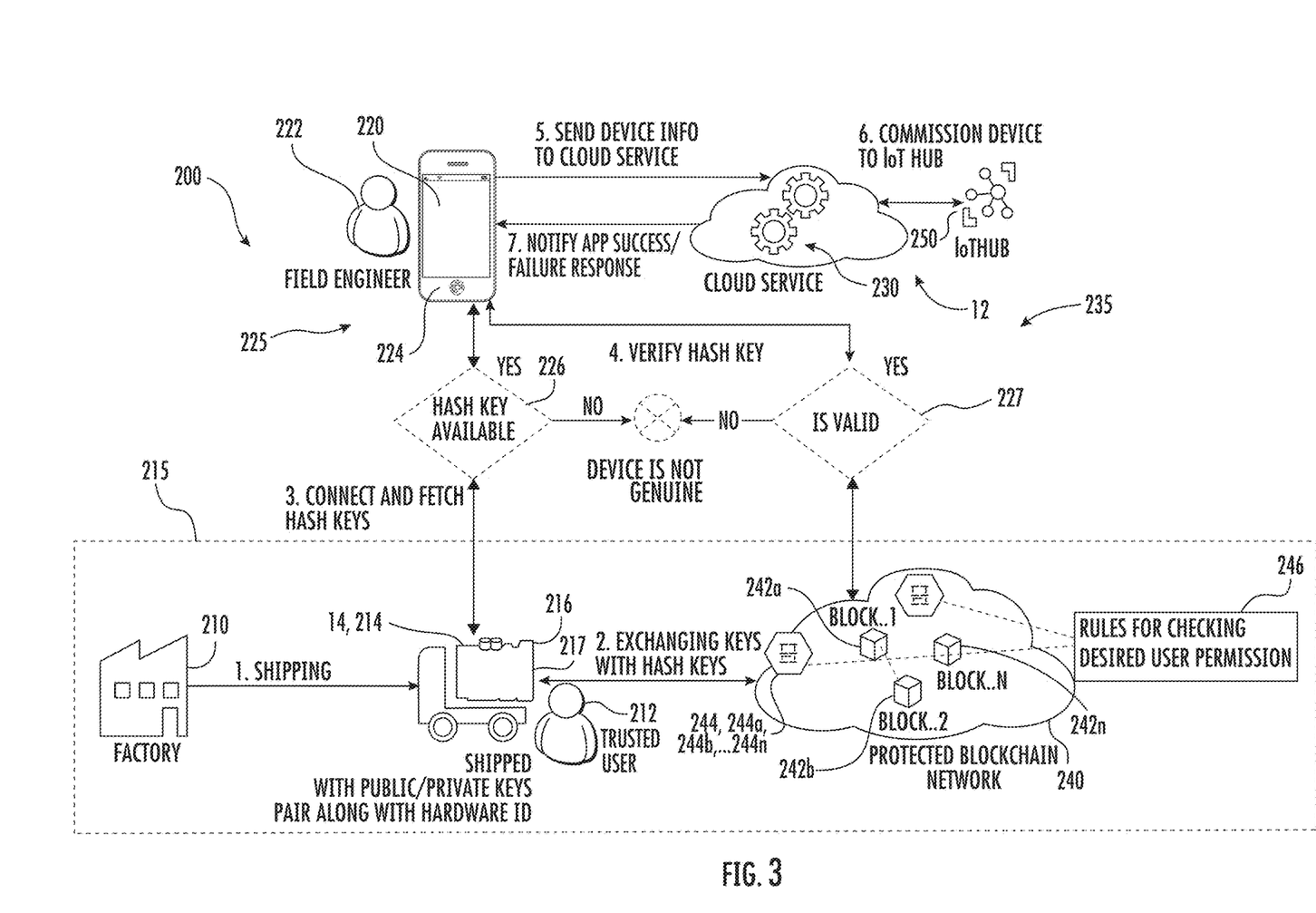
FIG. 3 illustrates a simplified block diagram of the processes of commissioning to an IoT Hub using a permissioned blockchain in accordance with one or more exemplary embodiments.

Turning now to FIG. 3, a simplified diagram depicting the process 200 of device commissioning to an IoT Hub 250 using a permissioned blockchain 240 in accordance with an embodiment. The process 200 permits an supplier 210 to commission their IoT devices 14 to a cloud service 12 to seamlessly provide access the cloud-based and/or on-premises applications 230 in the secure fashion after first authenticating against the permissioned blockchain 240. FIG. 3 depicts details of the interconnection and interaction or communication between cloud based components 230 and the device 14, also denoted in the figure are on-premises devices 214. In an embodiment the methodology includes a supplier portion 215, and enterprise or on-premises portion 225, and a cloud based portion 235 providing a cloud based apps, and the like.

The supplier portion 215 provides a supplier 210 the ability to establish a scheme of authentication that ultimately permits a user e.g., 222 to register a unique name, and/or their capabilities, with the above-mentioned cloud application 230, and provides the ability to validate the credential information. The on-premises portion 225 of the system 200 includes one or more on-premises computing devices 14*a-e* (as in FIG. 1) and/or 214 including, but not limited to, a processing system 100 or a portion thereof (as described with reference to FIG. 2) and a service tool 220 employed by an installer/field service personnel 222 executing an APP 224 to facilitate the commissioning. Finally, the cloud based portion includes a protected block chain 240 and an IoT Hub 250 accessible via a cloud service 230.

In an embodiment, to facilitate the implementation and to permit an enterprise to seamlessly access the cloud-based and on-premises applications in a secure fashion, an initial set-up or commissioning is conducted by the supplier of a device to enable establishing authentication against the cloud based applications. That is, to establish a secure communication between an on-premises device 14, 214 and the cloud based IoT Hub 250. To begin, a new on-premises device 14, 214 (device, server, or even cloud gateway) is delivered from a suppler 210. Each on-premises device 14, 214 can be a control panel, control device, mobile device, server, or cloud gateway or the like. In an embodiment the on-premises computing device 14, 214 is a common platform interface board (denoted CPIB) for an elevator system. As described with respect to FIG. 1, the on premise device 14, 214 may also be or include sensors 16 and even other computing devices e.g., 14*a-14e* that communicate with one another and would be desirable to commission to the IoT Hub 250. In a security or access control application the on-premises computing device 14, 220 may be a security or access control panel or server, and the sensors 16 might be various sensors as might be employed by the system. For example, motion sensors, occupancy sensors, door or window sensors, door reader, and the like. In an HVAC application, the on-premises computing device 14, 214 may be a thermostat/control panel, unit controller, and the sensors 16 might be various sensors as might be employed by the system. For example, temperature sensors, occupancy sensors, humidity sensors, and the like.

Continuing with FIG. 3, the on-premises device 14, 214 is delivered with some established public/private keys pair(s) 216 and some meta-information 217 (e.g., a hardware ID, device ID, name, firmware version, part number and other manufacturing details, and the like). Initially, a trusted owner/user 212, (or even an installer from the supplier 210, or field personnel 222) conducts an initial power on. On power on, the device hardware Id version and part number and other manufacturing details of the on-premises computing device 14, 214 is configured with a script designed to connect to a specific permissioned blockchain 240 also known as a distributed ledger, which is associated with the supplier/user 210. Generally to ensure authentication, a secure transport/trusted connection would be employed, for example using HTTPS protocol to connect to the blockchain network. The blockchain 240 network will be hosted on internal company network or other trusted network with industry standard protections. This network is not publicly accessible. The devices will be given privilege to access this network.

Upon verification of rules 246 for ensuring that the trusted owner/users 212 are authentic and have permissions to access the permissioned blockchain 240. One way this can be accomplished is with a whitelist of device IP address or MAC address on a network the device meta-information 217 is stored in blockchain 240. In an embodiment, for simplicity, the meta information 217 and public key 216 is stored in the blockchain 240 as a single transaction all in one block, shown generally, as 242 and specifically, as 242*a*, 242*b*, . . . 242*n*. As a result, the blockchain 240 generates one hash key, shown generally as 244, however individually as 244*a*, 244*b*, 244*n* for each respective storage transaction. In an embodiment, the hash key(s) 244 are generated by combining meta information 217 and public keys 216 and assigning them to one particular block e.g., 242*a*, 242*b* . . . 242*n* as pointer signifying that a validated transaction was completed on the block 242. The particular device e.g. one of the devices 14, 214 will have only on hash key 244*a*, 244*b* . . . 244*n*. This hash key 244 is transmitted back to the on premise device 14, 214 by the blockchain 240 and burned/flashed into device 14, 214 for non-volatile storage. As a result, the public/private keys 216 and meta-information 217 are deleted as no longer needed and as such, no longer available. If there is a need to reinitialize or recommission the device 14, 214 it will create a new different block 242 for example 242*b* and thereby a new hash key 244, for example, 244*b*. In an embodiment the new hash key 244*b* would have the old hash key e.g., 244*a* as pointer to old block, e.g., 242*a*. Thereby creating a ledger giving information about all transactions that occurred for that particular device 14, 214.

Continuing with FIG. 3, when field engineer/service technician 222 (though it could also be an installer from the suppler/trusted user 212) and the like undertakes to commission the particular on premise device 14, 214 to an IoT Hub 250 the engineer/technician/installer 222 connects to device 14, 214 via an APP 224 operating on the service tool 220. In an embodiment the service tool 220 may be another computing device 14 (such as a mobile device 14*a*, tablet, and the like as described herein) configured with at least an APP 224 to enable the service tool 220 to communicate with the on premise device 14, 214. When communication is established between the service tool 220 and the on premise device 14, 214 the APP 224 is configured to read the hash key 244 if available as depicted at 226. If no hash key 244 is available, the APP 224 indicates to the technician 222 that the computing device 14, 214 is not genuine (i.e., cannot be trusted for secure communication) because it has been tampered with, or the on premise device 14, 214 has not yet been initialized and therefore the on premise device 14, 214 cannot be commissioned. The APP 224 on the service tool/mobile device 220 connects to and communicates with the blockchain network 240 if the installer/technician 222 and service tool 220 are verified by the rules 246 as having acceptable access permissions. In an embodiment, the permissions granted to the installer/technician 222 with the service tool 220 are different than those permissions granted to the trusted user 212. For example, in an embodiment, an installer/technician would only be permitted read access to the permissioned blockchain 240, while the trusted user 212 might have read/write access. However, it is also possible that in some embodiments they are the same, or have the same access permissions to the blockchain 240. If the installer/technician 222 and service tool 220 are granted access, the APP 224 transmits and verifies the hash key 244 for the device 14, 214 with the blockchain 240 as depicted at 227. If the verification of the hash key 244 is unsuccessful, the APP 224 indicates to the technician 222 that the computing device 14, 214 is not genuine (cannot be trusted for secure communication) because it has been tampered with or otherwise corrupted and may need to be reinitialized. If the verification of the hash key 244 is successful the APP 224 sends the hash key 244 to the cloud service 230. The cloud service 230 in turn, creates a human readable string as a device ID (e.g., a logical device) for respective hash key 244. The cloud service 230 then connects to the IoT Hub 250 and transmits the device ID to the IoT Hub 250 and commissions the on premise device 14, 214 to the IoT Hub 250 for the particular on premise device 14, 214. The APP 224 notifies the service technician 222 based on the successful/failure response from cloud service 230.

Figure 4:
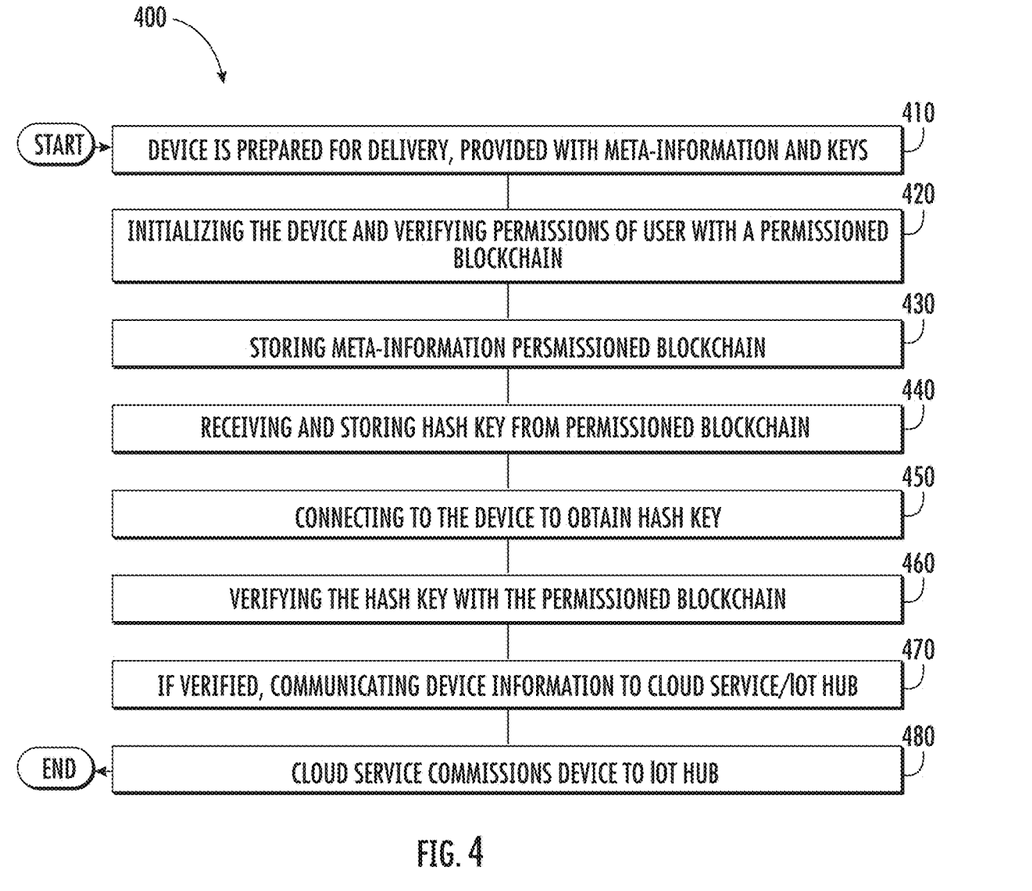
FIG. 4 illustrates a flowchart of a method for commissioning to an IoT Hub using a permissioned blockchain in accordance with one or more exemplary embodiments.

Turning now to FIG. 4 as well, a process diagram depicting the method 400 of commissioning a device 14m 214 to an IoT Hub 250 using permissioned blockchain 240 in accordance with an embodiment. The method initiates with process step 410 with a supplier 210 delivering a device 14, 214 to be commissioned with meta-information 217 and a public/private key pair 216. The on premise device 14, 214 is initialized, and the permissions of the user are verified with the permissioned blockchain 240 as depicted at process step 420. The method 400 continues with process step 430 where the device meta-information 217 is transmitted to and stored in blockchain 240. The permissioned blockchain 240 generates a hash key 244 as a result of storing the meta-information 217. This hash key 244 is transmitted back to the on premise device 14, 214 by the blockchain 240 and burned/flashed into device 14, 214 for non-volatile storage as depicted at process step 440.

Continuing with the method 400, when field engineer/service technician 222 undertakes to commission the particular on premise device 14, 214 to an IoT Hub 250 the engineer/technician/installer 222 connects to device 14, 214 via an APP 224 operating on the service tool 220 as depicted at process block 450. When communication is established the APP 224 reads the hash key 244 if available as depicted at 226. Once again, if no hash key 244 is available, the APP 224 indicates to the technician 222 that the computing device 14, 214 is not genuine. The APP 224 on the service tool/mobile device 220 connects to and communicates with the blockchain network 240 and the APP 224 transmits and verifies the hash key 244 for the device 14, 214 with the blockchain 240 as depicted at process step 460. If the verification of the hash key 244 is unsuccessful, the APP 224 indicates to the technician 222 that the computing device 14, 214 is not genuine and the device 14, 214 may need to be reinitialized. If the verification of the hash key 244 is successful the APP 224 sends required information to cloud service 230 as depicted at process step 470. Finally, as depicted at process step 480, the cloud service 230 connects to the IoT Hub 250 and commissions the on premise device 14, 214 to the IoT Hub 250 for the particular on-premises device 14, 214. Optionally, the APP 224 notifies the service technician 222 based on the successful/failure response from cloud service 230.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The following definitions and abbreviations are to be used for the interpretation of the claims and the specification. The terminology used herein is for the purpose of describing particular embodiments only and is not intended to be limiting. As used herein, the singular forms "a", "an" and "the" are intended to include the plural forms as well, unless the context clearly indicates otherwise. The terms "a", "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

It will be further understood that the terms "comprises" and/or "comprising," "includes," "including," "has," "having," "contains" or "containing," or any other variation thereof, when used in this specification, specify the presence of stated features, integers, steps, operations, elements, and/or components, but do not preclude the presence or addition of one or more other features, integers, steps, operations, elements, components, and/or groups thereof. The term "exemplary" is used herein to mean "serving as an example, instance, or illustration." Any embodiment or design described herein as "exemplary" is not necessarily to be construed as preferred or advantageous over other embodiments or designs.

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects in accordance with one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the present disclosure is not to be seen as limited by the foregoing description, but is only limited by the scope of the appended claims.

What is claimed is:

1. A method for commissioning a device to an Internet of Things (IoT) Hub using a permissioned blockchain, the method comprising:
    preparing a device for commissioning, the preparing including providing the device with meta-information and a set of cryptographic keys;
    initializing the device, the initializing configured to facilitate communication with a permissioned blockchain by a trusted user;
    storing at least a portion of the meta-information in the permissioned blockchain;
    receiving and storing by the device, a hash key generated by the permissioned blockchain, as a result of storing at least a portion of the meta-information in the permissioned blockchain;
    connecting to the device via a service tool to obtain the hash key;
    verifying the hash key with the permissioned block chain; and
    if the verifying is successful, communicating device information to a cloud service, the cloud service in communication with the IoT Hub to enable the commissioning;
    wherein the hash key is stored in the device, the hash key replacing the cryptographic keys.

2. The method of claim 1, wherein the meta-information includes at least a device identification.

3. The method of claim 1, wherein the cryptographic keys include at least one of a public key and a private key.

4. The method of claim 1, wherein the initializing includes verifying permissions for a trusted user/the device with the permissioned blockchain.

5. The method of claim 1, wherein the meta-information stored in the permissioned blockchain is sufficient to enable the commissioning to the IoT Hub.

6. The method of claim 1, wherein storing is in a single block of the permissioned blockchain.

7. The method of claim 1, wherein the hash key is generated based on the meta-information and the cryptographic keys.

8. The method of claim 1, wherein the connecting includes executing an application installed on the service tool configured to facilitate communication with at least one of the device, the permissioned blockchain, and a cloud service.

9. The method of claim 8, wherein the connecting includes permissioned communication with the permissioned block chain.

10. The method of claim 1, further including terminating the method if at least one of the hash key is not available on the device or the hash key is not verified by the permissioned blockchain.

11. The method claim 1, wherein the verifying is successful if the hash key stored on the device matches the hash key store in the permissioned blockchain.

12. The method of claim 1, further including notifying the service tool if the commissioning is successful.

13. The method of claim 1, wherein the blockchain includes rules for verifying permissions of at least a trusted user and the service tool.

14. The method of claim 1, wherein an operator of the service tool and the trusted user are the same.

15. A method for commissioning a device to an Internet of Things (IoT) Hub using a permissioned blockchain, the method comprising:
    preparing a device for commissioning, the preparing including providing the device with meta-information and a set of cryptographic keys;
    initializing the device, the initializing configured to facilitate communication with a permissioned blockchain by a trusted user;
    storing at least a portion of the meta-information in the permissioned blockchain;
    receiving and storing by the device, a hash key generated by the permissioned blockchain, as a result of storing at least a portion of the meta-information in the permissioned blockchain;
    connecting to the device via a service tool to obtain the hash key;
    verifying the hash key with the permissioned block chain; and
    if the verifying is successful, communicating device information to a cloud service, the cloud service in communication with the IoT Hub to enable the commissioning;
    wherein the device information communicated to the cloud service includes the hash key, and the cloud service connects to the IoT Hub and commissions the device to the IoT Hub.

16. A system for commissioning a device to Internet of Things (IoT) Hub using a permissioned blockchain, the system comprising:
    a permissioned blockchain;
    a device, the device including meta-information and a set of cryptographic keys, the device configured to facilitate communication with a permissioned blockchain by a trusted user;
    wherein at least a portion of the meta-information is stored in the permissioned blockchain;
    wherein the device receives and stores a hash key generated by the permissioned blockchain and the hash key is generated as a result of the meta-information being stored in the permissioned blockchain;
    a service tool in operable communication with the device and the permissioned blockchain, the service to configured to obtain the hash key from the device and verify the hash key with the permissioned block chain, wherein, if the has key is verified, the service tool communicates device information to a cloud service, the cloud service in communication with the IoT Hub to enable the commissioning;
    wherein the hash key is stored in the device, the hash key replacing the cryptographic keys.

17. The system of claim 16, wherein the meta-information includes identification information associated with the device.

18. The system of claim 16, wherein the permissioned blockchain is configured to verify permissions for a trusted user/the device.

\* \* \* \* \*